United States Patent
Wang et al.

(10) Patent No.: US 8,078,438 B2
(45) Date of Patent: Dec. 13, 2011

(54) METHOD FOR SIMULATING THERMAL RESISTANCE VALUE OF THERMAL TEST DIE

(75) Inventors: Feng-Ku Wang, Taipei (TW); Yi-Lun Cheng, Taipei (TW)

(73) Assignee: Inventec Corporation, Taipei (TW)

( * ) Notice: Subject to any disclaimer, the term of this patent is extended or adjusted under 35 U.S.C. 154(b) by 935 days.

(21) Appl. No.: 12/027,153

(22) Filed: Feb. 6, 2008

(65) Prior Publication Data

US 2009/0006048 A1   Jan. 1, 2009

(30) Foreign Application Priority Data

Jun. 26, 2007 (TW) .............................. 96123022 A

(51) Int. Cl.
*G06G 7/56* (2006.01)
(52) U.S. Cl. .............................................. 703/5; 703/6
(58) Field of Classification Search .................. 703/5, 6
See application file for complete search history.

(56) References Cited

U.S. PATENT DOCUMENTS

| | | | | |
|---|---|---|---|---|
| 2002/0185269 | A1* | 12/2002 | Sato | 165/185 |
| 2004/0036492 | A1* | 2/2004 | Gaasch et al. | 324/760 |
| 2006/0097384 | A1* | 5/2006 | Hamann et al. | 257/714 |
| 2007/0216024 | A1* | 9/2007 | Ono et al. | 257/719 |
| 2007/0267740 | A1* | 11/2007 | Khan et al. | 257/712 |

OTHER PUBLICATIONS

Gopinath et al. "An Integrated Methodology for Multiobjective Optimal Component Placement and Heat Sink Sizing", IEEE vol. 28, No. 4, Dec. 2005.*
Poppe et al. "Design Issues of a Multi-Functional Intelligent Thermal Test Die" 2001 IEEE.*
Wang et al. "3-D Thermal-ADI: A Linear-Time Chip Level Transient Thermal Simulator", IEEE vol. 21, No. 21, Dec. 2002.*

* cited by examiner

*Primary Examiner* — Kamini Shah
*Assistant Examiner* — Saif A Alhija
(74) *Attorney, Agent, or Firm* — J.C. Patents

(57) ABSTRACT

A method for simulating a thermal resistance value of a thermal test die is provided to estimate a relationship between the thermal resistance value of a heating block and the thermal resistance value of the thermal test die, and to find out a size of the heating block that matches an actual thermal situation of the thermal test die. In addition, after being tested by the heating block, the reliability of the testing result may be improved by verifying whether the relationship of a transient response of thermal resistance of the heating block and a steady-state response of thermal resistance of the thermal test die is within a range of a setting variation.

6 Claims, 3 Drawing Sheets

METHOD FOR SIMULATING THERMAL RESISTANCE VALUE OF THERMAL TEST DIE

CROSS-REFERENCE TO RELATED APPLICATION

This application claims the priority benefit of Taiwan application serial no. 96123022, filed on Jun. 26, 2007. The entirety of the above-mentioned patent application is hereby incorporated by reference herein and made a part of this specification.

BACKGROUND OF THE INVENTION

1. Field of the Invention

The present invention relates to a thermal performance testing method. More particularly, the present invention relates to a thermal performance testing method by which a heating block is used for simulating a thermal test die and a size of the heating block is determined.

2. Description of Related Art

In a present computer system, the working efficiency and working frequency of a central processing unit (CPU) are continually improved, and therefore thermal solution of the CPU has become one of the major subjects to various manufacturers, and meanwhile a coordination of a thermal performance of a thermal management module and a heating density of the CPU is taken into consideration.

When an engineer starts to design the thermal management module for a computer or a server, the thermal management module is first designed according to a space planning (such as location of a circuit layout, a main heating element, hard drives, and an interface card etc) of a computer or a server and a thermal effect required to be achieved. The thermal management module may be a combination of different kinds of heat pipes, fins, and thermal blocks used along with a self-designed fan. Meanwhile, the chip manufacturers may also design a thermal test die having a same heating performance with that of a real chip according to an actual thermal feature of the chip, so as to provide a pre-evaluation of the thermal performance of the thermal management module for the computer manufacturers.

However, quantity of the thermal test dies is limited, which is not enough for all the manufacturers for their thermal performance testing, and therefore a heating block having a uniform heating performance is generally used for substituting the thermal test die. The heating block is copper block having the uniform heating performance. However, the thermal test die is not an object with the uniform heating performance, and therefore with a same heating power, a thermal resistance value of the heating block is different from that of the thermal test die. Meanwhile, the heating power of the thermal test die may be increased along with the working frequency, and a stability of a testing result may be directly influenced by factors such as variation of an environmental temperature, and errors of a contact pressure etc. Therefore, if the heating block having the uniform heating performance is used for testing the thermal performance of the thermal management module, since the heating block has a unique size, heating performance and the thermal resistance of the thermal test die cannot be represented precisely, and accordingly the thermal quality of the thermal management modules cannot be ensured under mass production.

SUMMARY OF THE INVENTION

The present invention is directed to a method for simulating a thermal resistance value of a thermal test die, by which a corresponding relationship between a size of a heating block and a thermal resistance value of the heating block is obtained according to a numerical analysis experiment, so as to determine the size of the heating block.

The present invention is directed to a method for simulating a thermal resistance value of a thermal test die, by which reliability of a testing result may be improved by verifying whether a relationship of a thermal resistance of a heating block and a thermal resistance of the thermal test die is within a range of a setting variation.

The present invention provides a method for simulating a thermal resistance value of a thermal test die. The method includes the following steps. First, a thermal resistance value $R_{TTV}$ of a thermal test die is provided, and then thermal resistance values $R_{heater}$ of a plurality of heating blocks is provided, and a relationship between sizes of the heating blocks and the thermal resistance values $R_{heater}$ of the heating blocks is obtained. Next, a target value $R_{target}$ is set to determine the size of the heating block that matches the target value $R_{target}$, and then testing parameters for thermal performance are set, the heating block is heated, and a transient response value $R_{heater-T}$ of the thermal resistance of the heating block is measured. Finally, whether a relationship between the transient response value $R_{heater-T}$ of the thermal resistance of the heating block and a steady-state response value $R_{TTV-S}$ of the thermal resistance of the thermal test die is within a range of a setting variation is then verified.

In an embodiment of the present invention, obtaining of the corresponding relationship between the sizes of the heating blocks and the thermal resistance values $R_{heater}$ of the heating blocks includes determining a function curve between the sizes of the heating blocks and the thermal resistance values $R_{heater}$ of the heating blocks according to a regression analysis theory.

In an embodiment of the present invention, the target value $R_{target}$ may be set to a value close to the thermal resistance value $R_{TTV}$ of the thermal test die.

In an embodiment of the present invention, setting of the testing parameters for thermal performance includes: setting a preheat temperature of a heater; setting a contact pressure taken by the heating block; setting a time for the heating block reaching a balance temperature when the heating block is heated; and setting an error tolerance of an environmental temperature, etc.

In an embodiment of the present invention, the range of the setting variation includes a variation percentage being greater than and equal to 95%.

In an embodiment of the present invention, the method for simulating the thermal resistance value of the thermal test die further includes: when the relationship between the transient response value $R_{heater-T}$ of the thermal resistance of the heating block and a steady-state response value $R_{TTV-S}$ of the thermal resistance of the thermal test die is not within the range of the setting variation, the target value is reset to determine another size of the heating block that matches the reset target value, wherein the reset target value is more close to the thermal resistance value $R_{TTV}$ of the thermal test die compared to the former set target value $R_{target}$.

In an embodiment of the present invention, calculation of an average thermal resistance value $R_{heater-mean}$ and a standard deviation of the selected heating block may be further performed, after experimental data are verified.

The method for simulating the thermal resistance value of the thermal test die of the present invention may estimate a relationship between the thermal resistance value of a heating block and the thermal resistance value of the thermal test die to determine a size of the heating block that matches an actual thermal situation of the thermal test die. Moreover, after the thermal performance testing is performed on the selected heating block, reliability of the testing result may be improved by verifying whether a relationship of a transient response value of thermal resistance of the heating block and a steady-state response value of thermal resistance of the thermal test die is within a range of a setting variation.

In order to make the aforementioned and other objects, features and advantages of the present invention comprehensible, a preferred embodiment accompanied with figures is described in detail below.

DESCRIPTION OF EMBODIMENTS

A method for simulating a thermal resistance value of a thermal test die according to the present invention is mainly applied to a computer or a server, by which a relationship between the thermal resistance value $R_{heater}$ of a heating block and the thermal resistance value $R_{TTV}$ of the thermal test die is estimated, so as to quickly test a thermal performance of a thermal management module. Application of this method not only ensure the produced thermal management module matching a requirement of a system design to improve the quality of the products, but may also greatly decrease a testing time of the samples.

Since a material of the heating block is a uniform thermal conducting material, and the relationship between the sizes of the heating blocks and the thermal resistance values of the heating blocks may be represented by a function curve according to a regression analysis theory, so as to determine the size of the heating block for simulating the thermal resistance value $R_{TTV}$ of the thermal test die, and achieve a requirement of a thermal performance test. Therefore, when all the mass produced thermal management modules are assembled to the computer on the production line, the thermal performance of the thermal management modules may be tested by a temperature recorder and a thermal resistance measurement system to ensure all the manufactured thermal management modules may pass through the thermal performance test.

Figure 1:
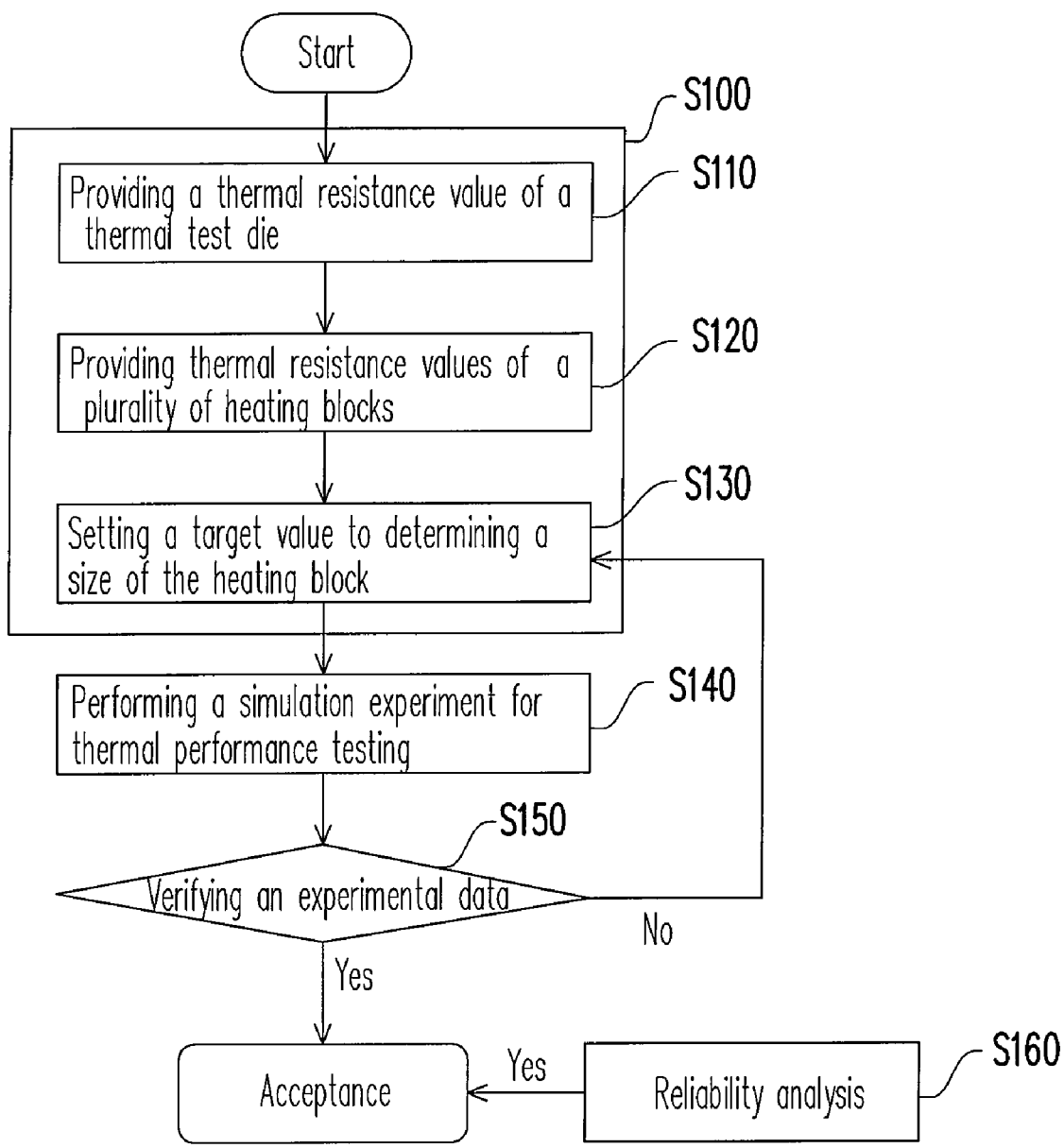
FIG. 1 is a flowchart of a method for simulating a thermal resistance value of a thermal test die according to an embodiment of the present invention.

FIG. 1 is a flowchart of a method for simulating a thermal resistance value of a thermal test die according to an embodiment of the present invention. The method for simulating a thermal resistance value of a thermal test die may be described in detail as follows.

First, step S100 includes the steps S110~S130 for determining the size of the heating block according to a temperature distribution of the thermal test die, wherein in the step S110, the thermal resistance value $R_{TTV}$ of the thermal test die is provided. The thermal test die may be designed by a chip manufacturer according to an actual heating performance of a chip (for example, a CPU). Though the thermal test die do not function as the CPU, they have similar heating performance, and therefore the thermal performance of the thermal management module may be pre-evaluated by applying the thermal test die. Since the thermal test die is not an object with a uniform heating performance, and the temperature distribution is uneven and the heating area is more likely concentrated on the central part, the heating block having the uniform heating performance with a similar shape to that of the thermal test die is not suitable for test.

The so called "thermal resistance" is defined as (temperature of a joint surface of a heat source TJ−ambient temperature Ta)/input power P, wherein the unit is ° C./W (i.e. the temperature variation of each unit of input power). The higher a heating density of the thermal test die is or the smaller the heating area is, the higher the generated thermal resistance value $R_{TTV}$ is, which represents a thermal management module with a better thermal effect is required.

To simulate the heating performance and the heating density of the thermal test die, in step S120 of FIG. 1, the thermal resistance values $R_{heater}$ of a plurality of heating blocks are provided by the manufactures for their thermal performance testing, and a relationship between the sizes of the heating blocks and its thermal resistance values $R_{heater}$ is obtained. The heating blocks may be copper blocks having a uniform thermal conductivity, and the smaller the heating area is, the greater the obtained thermal resistance value $R_{heater}$ is. Conversely, the greater the heating area is, the smaller the obtained thermal resistance value $R_{heater}$ is. Therefore, the relationship between the sizes of the heating blocks and the thermal resistance values $R_{heater}$ of the heating blocks may be represented by the function curve according to the regression analysis theory.

Figure 2:
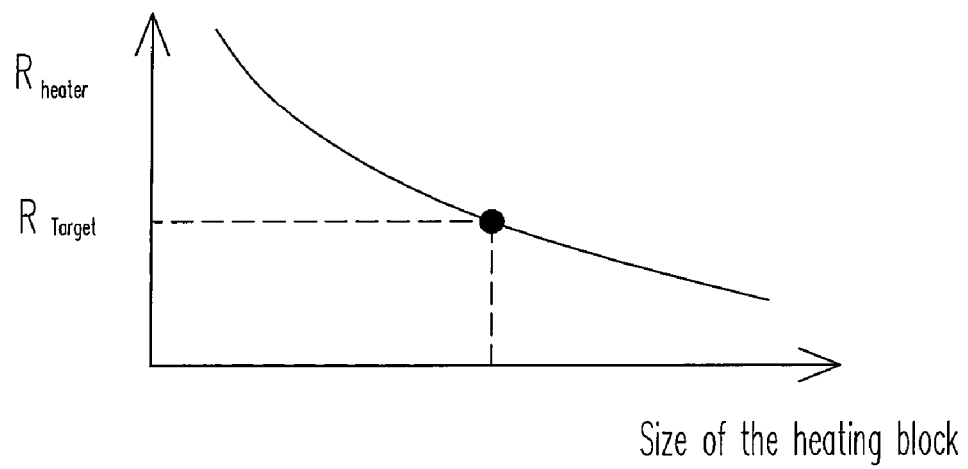
FIG. 2 is a function curve illustrating a relationship between a size of a heating block and its thermal resistance value according to a regression analysis theory.

FIG. 2 is a function curve illustrating a relationship between a size of a heating block and its thermal resistance value according to a regression analysis theory. Referring to FIG. 2, the heating blocks with different sizes are provided by the manufactures, and for an effective sampling, a quantity of the heating blocks may be ten or more. Then, a same thermal testing procedure is applied to the heating blocks with different sizes to obtain the thermal resistance value $R_{heater}$ of each heating block. Shown as experimental data of FIG. 2, the smaller the heating block is, the greater the thermal resistance value $R_{heater}$ is. Conversely, the greater the heating block is, the smaller the thermal resistance value $R_{heater}$ is.

Therefore, in step S130 of FIG. 1, a target value $R_{Target}$ may be set according to the function curve of FIG. 2, so as to determine a size of the heating block that matches the target value $R_{Target}$. In the present embodiment, the target value $R_{Target}$ may be set to a value close to the thermal resistance value $R_{TTV}$ of the thermal test die, and then a size of the heating block that matches the target value $R_{Target}$ is determined according to the function curve of FIG. 2.

Next, the selected heating block in the step S130 is applied to a simulation experiment for thermal performance testing of step S140. In the step S140, parameters for thermal performance testing of an actual thermal test die are set, and then the selected heating block is heated, and the steps of measuring a transient response value $R_{heater-T}$ of the thermal resistance of the heating block are performed. In the step S140, before the selected heating block is heated, the parameters for thermal performance testing are set as follows. For example, a preheat temperature (for example, 80° C.) of a heater is set; a contact pressure (for example, 90 psi) taken by the heating block is set; a time (for example, 90 seconds) for the heating block reaching a balance temperature after the heating block being heated is set; a measuring location and an error tolerance (for example, ±2° C.) of the environmental temperature is set; and speed of a cooling fan, specification of the thermal management module, performance of the testing equipment, etc. may all be set. The parameters for thermal performance testing may be adjusted according to an actual testing condition, and the input power P (for example, 35 W or more) closed to an actual heating status of the thermal test die and its steady-state response value $R_{TTV-S}$ of the thermal resistance are provided, so as to further heat the heating block and measure the transient response value $R_{heater-T}$ of the thermal resistance of the selected heating block. In the present embodiment, after the testing parameters for thermal performance are set, errors between actual measuring values and preset values may be detected by a real-time monitoring system. Then, the parameters such as the temperature/power of the heater, the contact pressure taken by the heating block, and the speed of the cooling fan may be adjusted to the preset value according to feedback errors, so as to obtain a more precise experimental data.

Figure 3:
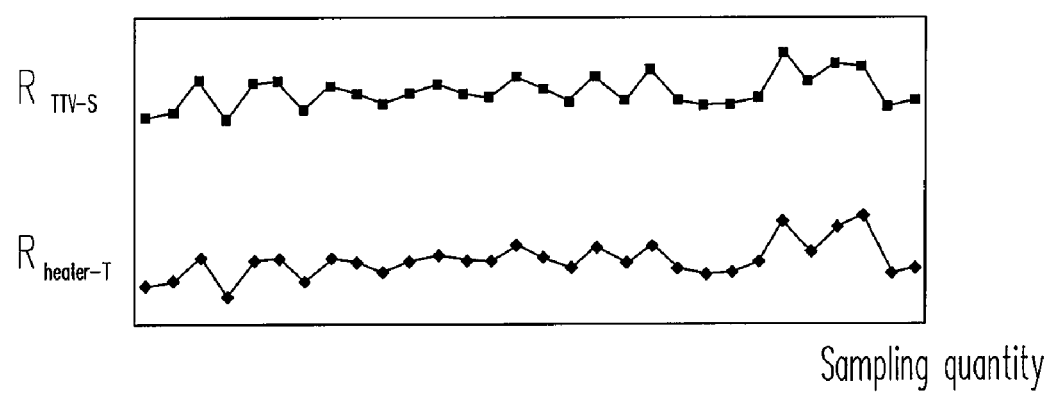
FIG. 3 is a diagram illustrating a relationship between the transient response value $R_{heater-T}$ of the thermal resistance of the heating block and the steady-state response value $R_{TTV-S}$ of the thermal resistance of the thermal test die.

FIG. 3 is a diagram illustrating a relationship between the transient response value $R_{heater-T}$ of the thermal resistance of the heating block and the steady-state response value $R_{TTV-S}$ of the thermal resistance of the thermal test die. In the experimental data of FIG. 3, 30 groups of measuring values and reference values are sampled, and statistics is performed on the measuring values and reference values to find out whether or not the transient response value $R_{heater-T}$ of the thermal resistance of the heating block matches the steady-state response value $R_{TTV-S}$ of the thermal resistance of the thermal test die, if yes, it represents the experimental data has a high reliability. Conversely, if not, it represents the experimental data does not have a high reliability, and a re-testing is required. For example, the more the sampling curve of the $R_{heater-T}$ is similar to the sampling curve of the $R_{TTV-S}$, the higher reliability the experimental data has.

Figure 4:
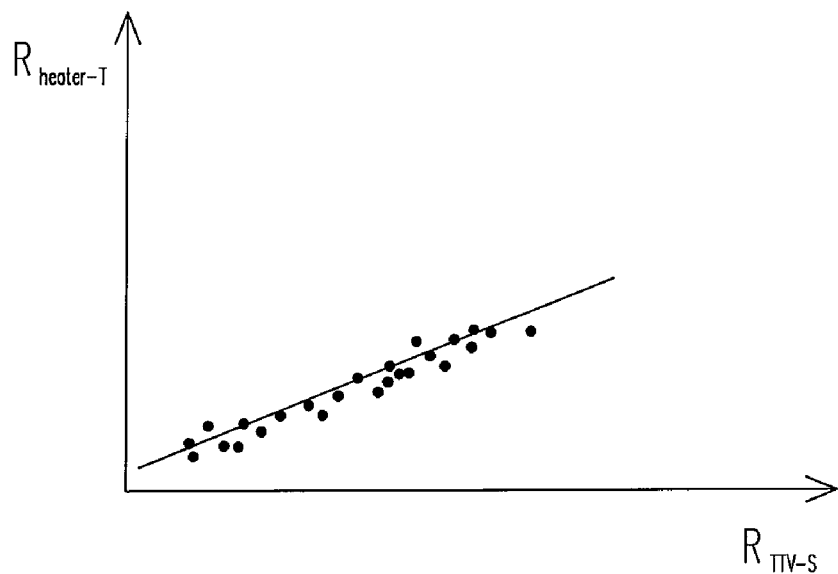
FIG. 4 is a diagram illustrating a linear function relationship of two variables according to a linear regression analysis.

Referring to FIG. 4 and step S150 of FIG. 1, to further verify the experimental data and determine the relationship between the transient response value $R_{heater-T}$ of the thermal resistance of the heating block and the steady-state response value $R_{TTV-S}$ of the thermal resistance of the thermal test die, a linear regression analysis is applied to determine whether a linear function of the two variables is within a range of a setting variation. For example, when the linear function of the two variables is Y=1.0209X−0.2677, and if the obtained variation (or decision coefficient $R^2$) is 0.9617, which is greater than a percentage of the setting variation (for example, 95%), it represents the experimental data has the high reliability, and matches the simulation experiment for thermal performance testing. Conversely, if the obtained variation is 0.9010, which is less than the percentage of the setting variation (for example, 95%), it represents the experiment data does not have the high reliability, and the re-testing is required.

In the step S150 of FIG. 1, when the experiment data does not have the high reliability, it represents the thermal resistance value $R_{heater}$ of the heating block does not match the thermal resistance value $R_{TTV}$ of the thermal test die, and the target value need to be reset to determine another size of the heating block, which matches the reset target value. For example, the target value is raised, such that the reset target value (for example R=1.5) is greater than the former preset target value $R_{Target}$ (for example, R=1.4), so that the reset target value is more close to the thermal resistance value $R_{TTV}$ (for example R=1.6) of the thermal test die than the former preset target value $R_{Target}$. Next, the size of the heating block that matches the reset target value is determined, and then the simulation experiment for thermal performance testing of the step S140 and reliability verification of the experimental data of the step S150 are re-performed. In this case, by applying the linear regression analysis and reliability verification on the transient response value $R_{heater-T}$ of the thermal resistance of the heating block, the steady-state response value $R_{TTV-S}$ of the thermal resistance, which matches the actual heating status of the thermal test die is then obtained.

Figure 5:
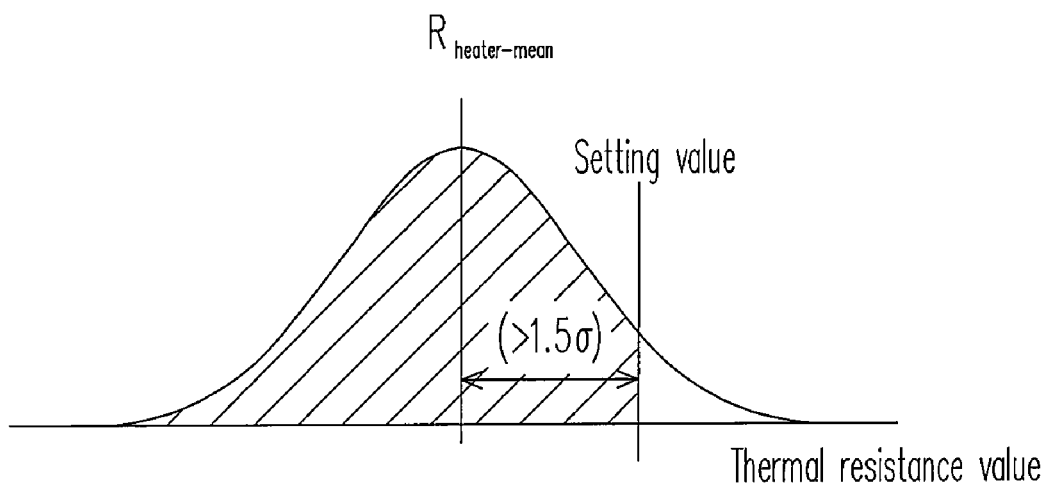
FIG. 5 is a distribution diagram of the thermal resistance values of the heating blocks according to an embodiment of the present invention.

Finally, the verified experimental data may further be analysed in step S160 to obtain a reliable domain range of the thermal management module shown as a distribution diagram of FIG. 5. Referring to FIG. 5, a reliability index relates to an arithmetic mean and a standard deviation of the variation. Therefore, whether or not the thermal management module of the present invention matches a designed specification may be confirmed by calculating an average thermal resistance value $R_{heater-mean}$ and a standard deviation σ of the selected heating block. If the average thermal resistance value $R_{heater-mean}$ of the heating block is less than the setting value of the heating block, and a difference there between is greater than the standard deviation (for example, greater than 1.5σ), the reliable domain range (shown in slash lines) of the thermal management module is relatively great. Conversely, if the average thermal resistance value $R_{heater-mean}$ of the heating block is greater than the setting value of the heating block, the reliable domain range of the thermal management module is relatively small. Namely, the distribution curve is reliable by determining the size of the heating block according to the aforementioned steps. In a conventional technique, since the heating block has a unique size, whether or not the thermal management modules match a designed thermal performance cannot be verified, and therefore its reliability is doubtful.

In summary, application of the method for simulating the thermal resistance value of the thermal test die of the present invention may estimate the relationship between the thermal resistance value of the heating block and the thermal resistance value of the thermal test die, and determine the size of the heating block that matches an actual thermal situation of the thermal test die. Moreover, after the thermal performance testing is performed on the selected heating block, reliability of the testing result may be improved by verifying whether the relationship of a transient response value of thermal resistance of the heating block and the steady-state response value of thermal resistance of the thermal test die is within the range of the setting variation.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for simulating a thermal resistance value of a thermal test die performed by a software program of a processor, comprising:

determining a size of one of a plurality of heating blocks according to a temperature distribution of the thermal test die, wherein the step of determining the size of the one heating block according to the temperature distribution of the thermal test die comprises:

providing a thermal resistance value $R_{TTV}$ of the thermal test die;

providing thermal resistance values $R_{heater}$ for the plurality of heating blocks, and obtaining a relationship between the sizes of the plurality of heating blocks and the thermal resistance values $R_{heater}$ of the plurality of heating blocks; and setting a target value $R_{Target}$ to determine the size of the one heating block that matches the target value $R_{Target}$;

setting at least one parameter for thermal performance testing, heating the heating block, and measuring a transient response value $R_{heater-T}$ of thermal resistance of the heating block; and verifying whether a relationship between the transient response value $R_{heater-T}$ of thermal resistance of the one heating block and a steady-state response value $R_{TTV-S}$ of thermal resistance of the thermal test die is within a range of a setting variation with the software program of the processor, and when the relationship between the transient response value $R_{heater-T}$ of the thermal resistance of the one heating block and the steady-state response value $R_{TTV-S}$ of the thermal resistance of the thermal test die is not within the range of the setting variation, the target value is reset to determine another size of the one heating block that matches the reset target value, and wherein the reset target value is more close to the thermal resistance value $R_{TTV}$ of the thermal test die compared to the former set target value $R_{Target}$.

2. The method for simulating a thermal resistance value of a thermal test die performed by a software program of a processor as claimed in claim 1, wherein the step of obtaining the relationship between the sizes of the heating blocks and the thermal resistance values $R_{heater}$ of the heating blocks comprises determining a function curve between the sizes of the heating blocks and the thermal resistance values $R_{heater}$ of the heating blocks according to a regression analysis theory.

3. The method for simulating a thermal resistance value of a thermal test die performed by a software program of a processor as claimed in claim 1, wherein the step of setting of the parameters for thermal performance testing comprises:
setting a preheat temperature of a heater;
setting a contact pressure taken by the heating block;
setting a time for the heating block to reach a balance temperature when the heating block is heated; and
setting an error tolerance of an environmental temperature.

4. The method for simulating a thermal resistance value of a thermal test die performed by a software program of a processor as claimed in claim 3, wherein after the testing parameters for thermal performance are set, an error between an actual measuring value and a predetermined value is detected on real-time basis, and the parameters for thermal performance testing are adjusted to a predetermined value according to a feedback error.

5. The method for simulating a thermal resistance value of a thermal test die performed by a software program of a processor as claimed in claim 1, wherein the range of the setting variation comprises a variation percentage that is greater than or equal to 95%.

6. The method for simulating a thermal resistance value of a thermal test die performed by a software program of a processor as claimed in claim 1 further comprising a step of calculating an average thermal resistance value $R_{heater-mean}$ and a standard deviation of the heating block.

* * * * *